United States Patent
Hsueh et al.

(10) Patent No.: US 11,603,444 B2
(45) Date of Patent: Mar. 14, 2023

(54) FOAMING COMPOSITION AND METHOD OF FORMING FOAM MATERIAL

(71) Applicant: INDUSTRIAL TECHNOLOGY RESEARCH INSTITUTE, Hsinchu (TW)

(72) Inventors: Mao-Lin Hsueh, Tainan (TW); Yi-Zhen Chen, Tainan (TW); Chih-Kuang Chang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 487 days.

(21) Appl. No.: 16/731,772

(22) Filed: Dec. 31, 2019

(65) Prior Publication Data
US 2021/0198442 A1 Jul. 1, 2021

(51) Int. Cl.
C08J 9/08 (2006.01)
C08J 9/00 (2006.01)
C08K 7/22 (2006.01)
C08K 3/34 (2006.01)

(52) U.S. Cl.
CPC ............... *C08J 9/08* (2013.01); *C08J 9/0066* (2013.01); *C08J 2203/02* (2013.01); *C08J 2369/00* (2013.01); *C08K 3/34* (2013.01); *C08K 7/22* (2013.01)

(58) Field of Classification Search
CPC ........ C08J 9/08; C08J 9/0066; C08J 2203/02; C08J 2369/00; C08J 9/02; C08K 3/34; C08K 7/22
See application file for complete search history.

(56) References Cited

U.S. PATENT DOCUMENTS

| | | | |
|---|---|---|---|
| 5,789,451 A * | 8/1998 | Guidetti | C08G 18/3296 521/174 |
| 6,339,129 B1 | 1/2002 | Webster | |
| 8,691,908 B2 | 4/2014 | Yeh et al. | |
| 9,260,405 B2 | 2/2016 | Yeh et al. | |
| 9,758,617 B2 | 9/2017 | Yeh et al. | |
| 9,839,906 B1 | 12/2017 | Hsueh et al. | |
| 2014/0191156 A1 | 7/2014 | Marks et al. | |
| 2015/0024138 A1 | 1/2015 | Figovsky et al. | |
| 2017/0218124 A1 | 8/2017 | Lauth et al. | |
| 2019/0185668 A1 | 6/2019 | Hsueh et al. | |
| 2021/0261772 A1* | 8/2021 | Zeller | C08L 75/12 |

FOREIGN PATENT DOCUMENTS

| | | |
|---|---|---|
| CN | 1297461 A | 5/2001 |
| CN | 1334827 A | 2/2002 |
| CN | 102408695 A | 4/2012 |
| CN | 102585688 A | 7/2012 |
| CN | 107522892 A | 12/2017 |
| TW | I504734 B | 10/2015 |

OTHER PUBLICATIONS

Cornille et al., "Room temperature flexible isocyanate-free polyurethane foams," European Polymer Journal, 84, (2016) 873-888. (Year: 2016).*
Guan et al., "Progress in Study of Non-Isocyanate Polyurethane," Ind. Eng. Chem. Res. 2011, 50, 6517-6527. (Year: 2011).*
Heyn et al., "Synthesis of Aromatic Carbamates from CO2: Implications for the Polyurethane Industry," Advances in Inorganic Chemistry, vol. 66, 2014, Elsevier Inc. pp. 83-115. (Year: 2014).*
Chinese Office Action and Search Report for corresponding Chinese Application No. 201911403060.7, dated Jul. 22, 2022.
Li et al., "Study on blends of five-membered carbonated soybean oil/ D GEBA," New Chemical Materials, vol. 37, No. 10, pp. 46-48, with English abstract, 2009.
Taiwanese Office Action and Search Report for Taiwanese Application No. 108148535, dated Sep. 1, 2020.
Blattmann et al., "Flexible and Bio-Based Nonisocyanate Polyurethane (NIPU) Foams", Macromol. Mater. Eng., vol. 301, 2016, pp. 944-952.
Cornille et al., "A new way of creating cellular polyurethane materials: NIPU foams", European Polymer Journal, vol. 66, 2015, pp. 129-138.
Grignard et al., "CO2-blown microcellular non-isocyanate polyurethane (NIPU) foams: from bio- and CO2-sourced monomers to potentially thermal insulating materials", Green Chem., vol. 18, 2016, pp. 2206-2215.

* cited by examiner

*Primary Examiner* — Kara B Boyle
(74) *Attorney, Agent, or Firm* — Birch, Stewart, Kolasch & Birch, LLP

(57) ABSTRACT

A method of forming foam material is provided, which includes mixing 100 parts by weight of a compound having cyclic carbonate groups and a foaming agent to form a foaming composition, wherein the foaming agent includes 3 to 13 parts by weight of carbamate salt and 15 to 65 parts by weight of amino compound. The foaming composition is heated to 100° C. to 170° C. for decomposing the carbamate salt into $CO_2$ and amino compound, and the amino compound is reacted with the compound having cyclic carbonate groups to form the foam material.

6 Claims, No Drawings

FOAMING COMPOSITION AND METHOD OF FORMING FOAM MATERIAL

TECHNICAL FIELD

The technical field relates to a foam material, and in particular it relates to a foaming composition for forming the foam material.

BACKGROUND

There are a great number of applications for foam materials, among which polyurethane foam materials have excellent chemical resistance, solvent resistance, abrasion resistance, and the like. They are therefore widely used in industry, especially in furniture, bedding, transportation, refrigerated construction, thermal insulation, and the like. In global polyurethane application fields and product distribution, lightweight foam products account for about 65% of all polyurethane markets, which is very alarming. The foaming agent used in the general foaming process refers to an additive that can form a porous structure in plastic, that is, the additive to produce foam structure. They can generate a large amount of gas under certain conditions to form porous structure materials with continuous or discontinuous pores (such as open or closed pores).

Currently, isocyanate foaming compositions in common use are toxic, and a novel foaming composition is called for to replace the isocyanates in foaming materials.

SUMMARY

One embodiment of the disclosure provides a foaming composition that includes: 100 parts by weight of a compound having cyclic carbonate groups; and a foaming agent, wherein the foaming agent includes: 3 to 13 parts by weight of carbamate salt; and 15 to 65 parts by weight of amino compound.

One embodiment of the disclosure provides a method of forming foam material, including: mixing 100 parts by weight of a compound having cyclic carbonate groups and a foaming agent to form a foaming composition, wherein the foaming agent includes 3 to 13 parts by weight of carbamate salt and 15 to 65 parts by weight of amino compound; in addition, heating the foaming composition to 100° C. to 170° C. for decomposing the carbamate salt into $CO_2$ and the amino compound, and the amino compound is reacted with the compound having cyclic carbonate groups to form a foam material.

DETAILED DESCRIPTION

One embodiment of the disclosure provides a foaming composition, including: 100 parts by weight of a compound having cyclic carbonate groups and a foaming agent. The foaming agent includes 3 to 13 parts by weight of carbamate salt and 15 to 65 parts by weight of amino compound. If the carbamate salt ratio is too low, the foaming effect will be insufficient. If the carbamate salt ratio is too high, the foam product will easily collapse and stick. If the amino compound ratio is too low, the foam product will be sticky. If the amino compound ratio is too high, the foam product will also be sticky. In some embodiments, the compound having cyclic carbonate groups includes compound having aliphatic cyclic carbonate groups, compound having alicyclic cyclic carbonate groups, compound having aromatic cyclic carbonate groups, or a combination thereof.

For example, the compound having cyclic carbonate groups may have a chemical structure of

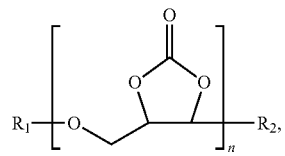

wherein n is an integer of 1 to 6; $R_1$ is aliphatic compound, alicyclic compound, aromatic compound, alkyl substituted aromatic compound, polyether oligomer, polyester oligomer, or a combination thereof; and $R_2$ is H, aliphatic compound, aliphatic compound containing cyclic carbonate groups, or a combination thereof.

In some embodiments, the compound having cyclic carbonate groups can be 1,4-butanediol diglycidyl cyclic carbonate ether (BDCE), resorcinol diglycidyl cyclic carbonate ether (RDCE), bisphenol A diglycidyl cyclic carbonate ether (DABCE), polypropylene glycol diglycidyl cyclic carbonate ether (PPGDCE), diglycidyl cyclic carbonate 1,2-cyclohexanedicarboxylate (DCCDC), 1,4-cycloexanedimethanol diglycidyl cyclic carbonate ether (CDCE), trimethylolpropane triglycidyl cyclic carbonate ether (PE300C, Mn=250 to 10000), cyclic carbonated soybean oil (CSBO) or a combination.

In some embodiments, the carbamate salt is formed by reacting the amino compound and $CO_2$ and has a chemical structure of

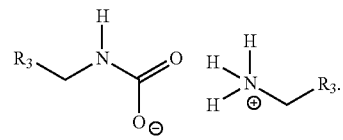

$R_3$ is $C_{1-12}$ polyether amine, alkylamine, cyclic alkyl amine, aromatic amine, or a combination thereof. In one embodiment, the amino compound includes polyether amine, alkyl amine, cyclic alkyl amine, aromatic amine, or a combination thereof. For example, the amino compound includes triethylenetetramine (TETA), trimethylhexamethylenediamine (TMD), polyethylenimine (branched, PEI300), 1,3-bis(aminomethyl)cyclohexane (1,3-BAC), m-xylenediamine (mXDA), polyoxypropylenediamine (Mn=200 to 4000), polyetheramine (Mn=100 to 200), ethylenediamine (EDA), or a combination thereof.

In some embodiment, the foaming composition further includes 0.1 to 10 parts by weight of epoxy compound having a chemical structure of:

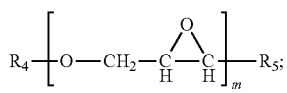

wherein in is an integer of 1 to 6; $R_4$ is aliphatic compound, alicyclic compound, aromatic compound, alkyl substituted aromatic compound, polyether oligomer, polyester oligomer, or a combination thereof; and $R_5$ is H, aliphatic compound, aliphatic compound containing cyclic carbonate groups, or a combination thereof. In one embodiment, the epoxy compound includes aliphatic epoxy compound, alicyclic epoxy compound, aromatic epoxy compound, or a combination thereof. The epoxy compound can improve the tensile strength and tear strength of the foam material. If the epoxy compound ratio is too high, the foam material will not be soft enough.

For example, the epoxy compound includes 1,4-butanediol diglycidyl ether (BDGE), resorcinol diglycidyl ether (RDGE), bisphenol A diglycidyl ether (DABGE), polypropylene glycol diglycidyl ether (PPGDGE), diglycidyl 1,2-cyclohexanedicarboxylate (DGCDC), 1,4-cycloexanedimethanol diglycidylether (CDGE), trimethylolpropane triglycidyl ether (PE300), epoxidized soybean oil (ESBO), or a combination thereof.

In some embodiments, the foaming composition further includes 2 to 10 parts by weight of filler, and the filler includes hollow beads, vermiculite, or a combination thereof. The hollow beads can be composed of plastic, ceramic, or glass. The filler may support the foam to prevent collapse. If the filler amount is too high, the foam will be too dense.

One embodiment of the disclosure provides a method of forming foam material, including: mixing 100 parts by weight of a compound having cyclic carbonate groups and a foaming agent to form a foaming composition. The foaming agent includes 3 to 13 parts by weight of carbamate salt and 15 to 65 parts by weight of amino compound. The composition and ratio of the foaming composition are described as above and not repeated here.

The foaming composition is then heated to 100° C. to 170° C. for decomposing the carbamate salt into $CO_2$ and the amino compound, and the amino compound is reacted with the compound having cyclic carbonate groups to form a foam material. If the heating temperature of the foaming composition is too low, the carbamate salt will not decompose into $CO_2$ and the amino compound, and the foaming effect cannot be achieved. If the heating temperature of the foaming composition is too high, bubbles in the foam product will break.

Accordingly, the carbamate salt may provide $CO_2$ (serving as the foaming agent) and react with cyclic carbonate groups through ring-opening reaction. Due to the foaming composition is free of halogen and isocyanate, the demands for environmental protection and low toxicity are met.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Synthesis Example 1 (CA-TETA)

TETA (150 g) was put into a jacketed glass reactor (2 L) and mechanically stirred, while $CO_2$ (20 Kg/cm$^2$) was introduced into TETA with a sprayer. The reactor was cooled and kept at 30° C. with cold water from circulating cooling tank for 1 hour in a first stage, and then heated to 60° C. and kept at 60° C. for 2 hours in a second stage. $CO_2$ was continuously introduced into and reacted with TETA in the first stage and the second stage. After the above reaction of $CO_2$ and TETA, a viscous liquid CA-TETA containing carbamate salt was obtained. CA-TETA was weighted to calculate its $CO_2$ content (15.19%), and analyzed by thermogravimetric analyzer (TGA) to calculate its $CO_2$ content (16.86%). Accordingly, the viscosity liquid contained 16.86 wt % of the carbamate salt. The viscosity liquid was analyzed by differential scanning calorimetry (DSC) to obtain its maximum foaming temperature (148.6° C.).

Synthesis Example 2 (CA-PEI300)

PEI300 (150 g) was put into a jacketed glass reactor (2 L) and mechanically stirred, while $CO_2$ (20 Kg/cm$^2$) was introduced into PEI300 with a sprayer. The reactor was cooled and kept at 30° C. with cold water from circulating cooling tank for 1 hour in a first stage, and then heated to 60° C. and kept at 60° C. for 2 hours in a second stage. $CO_2$ was continuously introduced into and reacted with PEI300 in the first stage and the second stage. After the above reaction of $CO_2$ and PEI300, a viscous liquid CA-PEI300 containing carbamate salt was obtained. CA-PEI300 was weighted to calculate its $CO_2$ content (9.98%), and analyzed by TGA to calculate its $CO_2$ content (9.78%). Accordingly, the viscosity liquid contained 9.78 wt % of the carbamate salt. The viscosity liquid was analyzed by DSC to obtain its maximum foaming temperature (155.7° C.).

Synthesis Example 3 (CA-TMD)

TMD (150 g) was put into a jacketed glass reactor (2 L) and mechanically stirred, while $CO_2$ (20 Kg/cm$^2$) was introduced into TMD with a sprayer. The reactor was cooled and kept at 30° C. with cold water from circulating cooling tank for 1 hour in a first stage, and then heated to 60° C. and kept at 60° C. for 2 hours in a second stage. $CO_2$ was continuously introduced into and reacted with TMD in the first stage and the second stage. After the above reaction of $CO_2$ and TMD, a viscous liquid CA-TMD containing carbamate salt was obtained. CA-TMD was weighted to calculate its $CO_2$ content (14.23%), and analyzed by TGA to calculate its $CO_2$ content (14.23%). Accordingly, the viscosity liquid contained 14.23 wt % of the carbamate salt. The viscosity liquid was analyzed by DSC to obtain its maximum foaming temperature (130.2° C.).

Synthesis Example 4 (CA-BAC)

BAC (150 g) was put into a jacketed glass reactor (2 L) and mechanically stirred, while $CO_2$ (20 Kg/cm$^2$) was introduced into BAC with a sprayer. The reactor was cooled and kept at 30° C. with cold water from circulating cooling tank for 1 hour in a first stage, and then heated to 60° C. and kept at 60° C. for 2 hours in a second stage. $CO_2$ was continuously introduced into and reacted with BAC in the first stage and the second stage. After the above reaction of $CO_2$ and BAC, a viscous liquid CA-BAC containing carbamate salt was obtained. CA-BAC was weighted to calculate its $CO_2$ content (11.96%), and analyzed by TGA to calculate its $CO_2$ content (12.67%). Accordingly, the viscosity liquid contained 12.67 wt % of the carbamate salt. The viscosity liquid was analyzed by DSC to obtain its maximum foaming temperature (135.7° C.).

Synthesis Example 5 (CA-mXDA)

mXDA (150 g) was put into a jacketed glass reactor (2 L) and mechanically stirred, while $CO_2$ (20 Kg/cm$^2$) was introduced into mXDA with a sprayer. The reactor was cooled and kept at 30° C. with cold water from circulating cooling tank for 1 hour in a first stage, and then heated to 60° C. and kept at 60° C. for 2 hours in a second stage. $CO_2$ was continuously introduced into and reacted with mXDA in the first stage and the second stage. After the above reaction of $CO_2$ and mXDA, a viscous liquid CA-mXDA containing carbamate salt was obtained. CA-mXDA was weighted to calculate its $CO_2$ content (12.75%), and analyzed by TGA to calculate its $CO_2$ content (13.02%). Accordingly, the viscosity liquid contained 13.02 wt % of the carbamate salt. The viscosity liquid was analyzed by DSC to obtain its maximum foaming temperature (152.3° C.).

Synthesis Example 6 (CSBO)

Epoxidized soybean oil (150 g) and catalyst tetrabutylammonium bromide (TBAB, 1.5 g, 2 wt %) were put into a reaction tank, while $CO_2$ (20 $Kg/cm^2$) was introduced into the reaction tank, and the mixture in the reaction tank was heated to 140° C. and continuously stirred to react for 24 hours to obtain CSBO. The conversion ratio (99%) of the above reaction was determined by $^1H$ NMR.

Example 1

CSBO (100 parts by weight) and CA-TETA (36.4 parts by weight, containing 16.86% of carbamate salt, such as 6.1 parts by weight of carbamate salt and 30.3 parts by weight of TETA) were stirred to mix well, and then put into an oven at 130° C. for 20 minutes to obtain a product. The product had a density of 107 $Kg/m^3$, a tensile strength of 0.11 $Kgf/cm^2$, an elongation of 24.2%, and a tear strength of 0.33 Kgf/cm. In this example and following examples, the density was measured by the standard ASTM D3574, the tensile strength was measured by the standard ASTM D3574, the elongation ratio was measured by the standard ASTM D3574, and the tear strength was measured by the standard ASTM D3574.

Example 2

CSBO (100 parts by weight), CA-TETA (36.4 parts by weight, containing 16.86% of carbamate salt, such as 6.1 parts by weight of carbamate salt and 30.3 parts by weight of TETA), and filler 031DU40 (commercially available from AkzoNobel, 5% of the total weight of CSBO and CA-TETA) were stirred to mix well, and then put into an oven at 130° C. for 30 minutes to obtain a product. The product had a density of 103 $Kg/m^3$, a tensile strength of 0.15 $Kgf/cm^2$, an elongation of 36.7%, and a tear strength of 0.22 Kgf/cm.

Example 3

CSBO (100 parts by weight), CA-TETA (36.4 parts by weight, containing 16.86% of carbamate salt, such as 6.1 parts by weight of carbamate salt and 30.3 parts by weight of TETA), and filler 031DU40 (commercially available from AkzoNobel, 5% of the total weight of CSBO and CA-TETA) were stirred to mix well, and then put into an oven at 150° C. for 30 minutes to obtain a product. The product had a density of 95 $Kg/m^3$, a tensile strength of 0.17 $Kgf/cm^2$, an elongation of 31.8%, and a tear strength of 0.24 Kgf/cm.

Example 4

CSBO (100 parts by weight), CA-TETA (36.9 parts by weight, containing 16.86% of carbamate salt, such as 6.2 parts by weight of carbamate salt and 30.7 parts by weight of TETA), epoxy resin BDGE (1.8 parts by weight), and filler 031DU40 (commercially available from AkzoNobel, 5% of the total weight of CSBO, CA-TETA, and BDGE) were stirred to mix well, and then put into an oven at 130° C. for 30 minutes to obtain a product. The product had a density of 122 $Kg/m^3$, a tensile strength of 0.15 $Kgf/cm^2$, an elongation of 38.8%, and a tear strength of 0.21 Kgf/cm.

Example 5

CSBO (100 parts by weight), CA-TETA (37.8 parts by weight, containing 16.86% of carbamate salt, such as 6.4 parts by weight of carbamate salt and 31.4 parts by weight of TETA), epoxy resin BDGE (3.7 parts by weight), filler 031DU40 (commercially available from AkzoNobel, 5% of the total weight of CSBO, CA-TETA, and BDGE) were stirred to mix well, and then put into an oven at 130° C. for 30 minutes to obtain a product. The product had a density of 114 $Kg/m^3$, a tensile strength of 0.57 $Kgf/cm^2$, an elongation of 39.5%, and a tear strength of 0.45 Kgf/cm.

Example 6

CSBO (100 parts by weight), CA-TETA (36.8 parts by weight, containing 16.86% of carbamate salt, such as 6.2 parts by weight of carbamate salt and 30.6 parts by weight of TETA), epoxy resin RDGE (2.1 parts by weight), filler 031DU40 (commercially available from AkzoNobel, 5% of the total weight of CSBO, CA-TETA, and RDGE) were stirred to mix well, and then put into an oven at 130° C. for 30 minutes to obtain a product. The product had a density of 106 $Kg/m^3$, a tensile strength of 0.19 $Kgf/cm^2$, an elongation of 35.5%, and a tear strength of 0.20 Kgf/cm.

Example 7

CSBO (100 parts by weight), CA-TETA (37.6 parts by weight, containing 16.86% of carbamate salt, such as 6.3 parts by weight of carbamate salt and 31.3 parts by weight of TETA), epoxy resin RDGE (4.3 parts by weight), filler 031DU40 (commercially available from AkzoNobel, 5% of the total weight of CSBO, CA-TETA, and RDGE) were stirred to mix well, and then put into an oven at 130° C. for 30 minutes to obtain a product. The product had a density of 97 $Kg/m^3$, a tensile strength of 0.70 $Kgf/cm^2$, an elongation of 40.3%, and a tear strength of 0.36 Kgf/cm.

Example 8

CSBO (100 parts by weight), CA-TETA (36.8 parts by weight, containing 16.86% of carbamate salt, such as 6.2 parts by weight of carbamate salt and 30.6 parts by weight of TETA), epoxy resin DABGE (3.2 parts by weight), filler 031DU40 (commercially available from AkzoNobel, 5% of the total weight of CSBO, CA-TETA, and DABGE) were stirred to mix well, and then put into an oven at 130° C. for 30 minutes to obtain a product. The product had a density of 96 $Kg/m^3$, a tensile strength of 0.16 $Kgf/cm^2$, an elongation of 38.3%, and a tear strength of 0.22 Kgf/cm.

Example 9

CSBO (100 parts by weight), CA-TETA (37.7 parts by weight, containing 16.86% of carbamate salt, such as 6.4 parts by weight of carbamate salt and 31.3 parts by weight of TETA), epoxy resin DABGE (6.6 parts by weight), and filler 031DU40 (commercially available from AkzoNobel, 5% of the total weight of CSBO, CA-TETA, and DABGE)

were stirred to mix well, and then put into an oven at 130° C. for 30 minutes to obtain a product. The product had a density of 101 Kg/m$^3$, a tensile strength of 0.82 Kgf/cm$^2$, an elongation of 31.1%, and a tear strength of 0.55 Kgf/cm.

Example 10

CSBO (100 parts by weight), CA-TETA (36.4 parts by weight, containing 16.86% of carbamate salt, such as 6.1 parts by weight of carbamate salt and 30.3 parts by weight of TETA), filler 031DU40 (commercially available from AkzoNobel, 2.5% of the total weight of CSBO and CA-TETA), and filler 920DU40 (commercially available from AkzoNobel, 2.5% of the total weight of CSBO and CA-TETA) were stirred to mix well, and then put into an oven at 150° C. for 30 minutes to obtain a product. The product had a density of 82 Kg/m$^3$, a tensile strength of 0.15 Kgf/cm$^2$, an elongation of 32.2%, and a tear strength of 0.26 Kgf/cm.

Example 11

CSBO (100 parts by weight), CA-TETA (36.4 parts by weight, containing 16.86% of carbamate salt, such as 6.1 parts by weight of carbamate salt and 30.3 parts by weight of TETA), and filler 920DU40 (commercially available from AkzoNobel, 2.5% of the total weight of CSBO and CA-TETA) were stirred to mix well, and then put into an oven at 150° C. for 30 minutes to obtain a product. The product had a density of 157 Kg/m$^3$, a tensile strength of 0.39 Kgf/cm$^2$, an elongation of 25.1%, and a tear strength of 0.40 Kgf/cm.

of TETA), filler 031DU40 (commercially available from AkzoNobel, 2.5% of the total weight of CSBO and CA-TETA), and filler 920DU40 (commercially available from AkzoNobel, 2.5% of the total weight of CSBO and CA-TETA) were stirred to mix well, and then put into an oven at 150° C. for 60 minutes to obtain a product. The product had a density of 92 Kg/m$^3$, a tensile strength of 0.12 Kgf/cm$^2$, and an elongation of 75.6%.

Example 13

CSBO (100 parts by weight), CA-TETA (72.7 parts by weight, containing 16.86% of carbamate salt, such as 12.2 parts by weight of carbamate salt and 60.5 parts by weight of TETA), filler 031DU40 (commercially available from AkzoNobel, 2.5% of the total weight of CSBO and CA-TETA), and filler 920DU40 (commercially available from AkzoNobel, 2.5% of the total weight of CSBO and CA-TETA) were stirred to mix well, and then put into an oven at 150° C. for 60 minutes to obtain a product. The product had a density of 80 Kg/m$^3$, a tensile strength of 0.10 Kgf/cm$^2$, and an elongation of 94.7%.

Example 14

CSBO (100 parts by weight), CA-TETA (28.8 parts by weight, containing 16.86% of carbamate salt, such as 4.8 parts by weight of carbamate salt and 24.0 parts by weight of TETA), CA-TMD (7.6 parts by weight, containing 14.23 wt % of carbamate salt, such as 1.1 parts by weight of

TABLE 1

| Example | Compound having cyclic carbonate groups | Epoxy resin | Foaming agent (carbamate salt/amino compound) | Density (Kg/m$^3$) | Tensile strength (Kgf/cm$^2$) | Elongation (%) | Tear strength (Kgf/cm) |
|---|---|---|---|---|---|---|---|
| 1 | CSBO (100) | None | CA-TETA (6.1/30.3) | 107 | 0.11 | 24.2 | 0.33 |
| 2 | CSBO (100) | None | CA-TETA (6.1/30.3) | 103 | 0.15 | 36.7 | 0.22 |
| 3 | CSBO (100) | None | CA-TETA (6.1/30.3) | 95 | 0.17 | 31.8 | 0.24 |
| 4 | CSBO (100) | BDGE (1.8) | CA-TETA (6.2/30.7) | 122 | 0.15 | 38.8 | 0.21 |
| 5 | CSBO (100) | BDGE (3.7) | CA-TETA (6.4/31.4) | 114 | 0.57 | 39.5 | 0.45 |
| 6 | CSBO (100) | RDGE (2.1) | CA-TETA (6.2/30.6) | 106 | 0.19 | 35.5 | 0.20 |
| 7 | CSBO (100) | RDGE (4.3) | CA-TETA (6.3/31.3) | 97 | 0.70 | 40.3 | 0.36 |
| 8 | CSBO (100) | DABGE (3.2) | CA-TETA (6.2/30.6) | 96 | 0.16 | 38.3 | 0.22 |
| 9 | CSBO (100) | DABGE (6.6) | CA-TETA (6.4/31.3) | 101 | 0.82 | 31.1 | 0.55 |
| 10 | CSBO (100) | None | CA-TETA (6.1/30.3) | 82 | 0.15 | 32.2 | 0.26 |
| 11 | CSBO (100) | None | CA-TETA (6.1/30.3) | 157 | 0.39 | 25.1 | 0.40 |

As seen from Table 1, the epoxy resin (serving as cross-linking agent) could help to increase the tensile strength and tear strength of the foam material.

Example 12

CSBO (100 parts by weight), CA-TETA (18.2 parts by weight, containing 16.86% of carbamate salt, such as 3.1 parts by weight of carbamate salt and 15.1 parts by weight carbamate salt and 6.5 parts by weight of TMD), filler 031DU40 (commercially available from AkzoNobel, 2.5% of the total weight of CSBO, CA-TETA, and CA-TMD), and filler 920DU40 (commercially available from AkzoNobel, 2.5% of the total weight of CSBO, CA-TETA, and CA-TMD) were stirred to mix well, and then put into an oven at 150° C. for 30 minutes to obtain a product. The product had a density of 109 Kg/m$^3$, a tensile strength of 0.31 Kgf/cm$^2$, an elongation of 67.2%, and a tear strength of 0.53 Kgf/cm.

Example 15

CSBO (100 parts by weight), CA-TETA (28.9 parts by weight, containing 16.86% of carbamate salt, such as 4.9 parts by weight of carbamate salt and 24.0 parts by weight of TETA), CA-BAC (6.8 parts by weight, containing 12.67 wt % of carbamate salt, such as 0.8 parts by weight of carbamate salt and 6.0 parts by weight of BAC), filler 031DU40 (commercially available from AkzoNobel, 2.5% of the total weight of CSBO, CA-TETA, and CA-BAC), and filler 920DU40 (commercially available from AkzoNobel, 2.5% of the total weight of CSBO, CA-TETA, and CA-BAC) were stirred to mix well, and then put into an oven at 150° C. for 30 minutes to obtain a product. The product had a density of 112 Kg/m$^3$, a tensile strength of 0.35 Kgf/cm$^2$, an elongation of 47.1%, and a tear strength of 0.68 Kgf/cm.

Example 16

CSBO (100 parts by weight), CA-TETA (28.9 parts by weight, containing 16.86% of carbamate salt, such as 4.9 parts by weight of carbamate salt and 24.0 parts by weight of TETA), CA-PEI300 (6.8 parts by weight, containing 9.78 wt % of carbamate salt, such as 0.7 parts by weight of carbamate salt and 6.1 parts by weight of PEI300), filler 031DU40 (commercially available from AkzoNobel, 2.5% of the total weight of CSBO, CA-TETA, and CA-PEI300), and filler 920DU40 (commercially available from AkzoNobel, 2.5% of the total weight of CSBO, CA-TETA, and CA-PEI300) were stirred to mix well, and then put into an oven at 150° C. for 30 minutes to obtain a product. The product had a density of 118 Kg/m$^3$, a tensile strength of 0.44 Kgf/cm$^2$, an elongation of 33.9%, and a tear strength of 0.46 Kgf/cm.

Example 17

CSBO (100 parts by weight), CA-TETA (28.8 parts by weight, containing 16.86% of carbamate salt, such as 4.8 parts by weight of carbamate salt and 24.0 parts by weight of TETA), CA-mXDA (8.2 parts by weight, containing 13.02% of carbamate salt, such as 1.1 parts by weight of carbamate salt and 7.1 parts by weight of mXDA), filler 031DU40 (commercially available from AkzoNobel, 2.5% of the total weight of CSBO, CA-TETA, and CA-mXDA), and filler 920DU40 (commercially available from AkzoNobel, 2.5% of the total weight of CSBO, CA-TETA, and CA-mXDA) were stirred to mix well, and then put into an oven at 150° C. for 30 minutes to obtain a product. The product had a density of 120 Kg/m$^3$, a tensile strength of 0.47 Kgf/cm$^2$, an elongation of 52.6%, and a tear strength of 0.51 Kgf/cm.

TABLE 2

| Example | Compound having cyclic carbonate groups | Foaming agent (carbamate salt/amino compound) | Density (Kg/m$^3$) | Tensile strength (kgf/cm$^2$) | Elongation (%) | Tear strength (Kgf/cm) |
|---|---|---|---|---|---|---|
| 10 | CSBO (100) | CA-TETA (6.1/30.3) | 82 | 0.15 | 32.2 | 0.26 |
| 12 | CSBO (100) | CA-TETA (3.1/15.1) | 92 | 0.12 | 75.6 | Not measured |
| 13 | CSBO (100) | CA-TETA (12.2/60.5) | 80 | 0.10 | 94.7 | Not measured |
| 14 | CSBO (100) | CA-TETA (4.8/24.0) + CA-TMD (1.1/6.5) | 109 | 0.31 | 67.2 | 0.53 |
| 15 | CSBO (100) | CA-TETA (4.9/24.0) + CA-BAC (0.8/6.0) | 112 | 0.35 | 47.1 | 0.68 |
| 16 | CSBO (100) | CA-TETA (4.9/24.0) + CA-PEI300 (0.7/6.1) | 118 | 0.44 | 33.9 | 0.46 |
| 17 | CSBO (100) | CA-TETA (4.8/24.0) + CA-mXDA (1.1/7.1) | 120 | 0.47 | 52.6 | 0.51 |

As shown in Table 2, the foaming composition could be adjusted to enhance the tensile strength and density of the foam materials.

Example 18

CDCE (100 parts by weight), CA-TETA (54.6 parts by weight, containing 16.86% of carbamate salt, such as 9.2 parts by weight of carbamate salt and 45.4 parts by weight of TETA), filler 031DU40 (commercially available from AkzoNobel, 2.5% of the total weight of CDCE and CA-TETA) and filler 920DU40 (commercially available from AkzoNobel, 2.5% of the total weight of CDCE and CA-TETA) were stirred to mix well, and then put into an oven at 150° C. for 30 minutes to obtain a product. The product had a density of 139 Kg/m$^3$, a tensile strength of 1.06 Kgf/cm$^2$, and an elongation of 8.2%.

Example 19

PE300C (100 parts by weight), CA-TETA (59.7 parts by weight, containing 16.86% of carbamate salt, such as 10.1 parts by weight of carbamate salt and 49.6 parts by weight of TETA), filler 031DU40 (commercially available from AkzoNobel, 2.5% of the total weight of PE300C and CA-TETA) and filler 920DU40 (commercially available from AkzoNobel, 2.5% of the total weight of PE300C and CA-TETA) were stirred to mix well, and then put into an oven at 150° C. for 30 minutes to obtain a product. The product had a density of 142 Kg/m$^3$, a tensile strength of 0.88 Kgf/cm$^2$, and an elongation of 15.1%.

Example 20

RDCE (100 parts by weight), CA-TETA (53.6 parts by weight, containing 16.86% of carbamate salt, such as 9.0 parts by weight of carbamate salt and 44.6 parts by weight of TETA), filler 031DU40 (commercially available from AkzoNobel, 2.5% of the total weight of RDCE and CA-TETA), and filler 920DU40 (commercially available from AkzoNobel, 2.5% of the total weight of RDCE and CA-TETA) were stirred to mix well, and then put into an oven at 150° C. for 30 minutes to obtain a product. The product had a density of 138 Kg/m$^3$, a tensile strength of 1.24 Kgf/cm$^2$, and an elongation of 9.5%.

Example 21

CSBO (100 parts by weight), CDCE (28.6 parts by weight), CA-TETA (50.3 parts by weight, containing 16.86% of carbamate salt, such as 8.5 parts by weight of carbamate salt and 41.8 parts by weight of TETA), filler 031DU40 (commercially available from AkzoNobel, 2.5% of the total weight of CSBO, CDCE, and CA-TETA), and filler 920DU40 (commercially available from AkzoNobel, 2.5% of the total weight of CSBO, CDCE, and CA-TETA) were stirred to mix well, and then put into an oven at 150° C. for 30 minutes to obtain a product. The product had a density of 94 Kg/m$^3$, a tensile strength of 0.51 Kgf/cm$^2$, an elongation of 27.4%, and a tear strength of 0.45 Kgf/cm.

Example 22

CSBO (100 parts by weight), PE300C (36.1 parts by weight), CA-TETA (50.1 parts by weight, containing 16.86% of carbamate salt, such as 8.4 parts by weight of carbamate salt and 41.7 parts by weight of TETA), filler 031DU40 (commercially available from AkzoNobel, 2.5% of the total weight of CSBO, PE300C, and CA-TETA), and filler 920DU40 (commercially available from AkzoNobel, 2.5% of the total weight of CSBO, PE300C, and CA-TETA) were stirred to mix well, and then put into an oven at 150° C. for 30 minutes to obtain a product. The product had a density of 93 Kg/m$^3$, a tensile strength of 0.28 Kgf/cm$^2$, an elongation of 35.9%, and a tear strength of 0.26 Kgf/cm.

Example 23

CSBO (100 parts by weight), RDCE (25.9 parts by weight), CA-TETA (50.2 parts by weight, containing 16.86% of carbamate salt, such as 8.5 parts by weight of carbamate salt and 41.7 parts by weight of TETA), filler 031DU40 (commercially available from AkzoNobel, 2.5% of the total weight of CSBO, RDCE, and CA-TETA), and filler 920DU40 (commercially available from AkzoNobel, 2.5% of the total weight of CSBO, RDCE, and CA-TETA) were stirred to mix well, and then put into an oven at 150° C. for 30 minutes to obtain a product. The product had a density of 99 Kg/m$^3$, a tensile strength of 0.56 Kgf/cm$^2$, an elongation of 25.5%, and a tear strength of 0.58 Kgf/cm.

TABLE 3

| Example | Compound having cyclic carbonate groups | Foaming agent (carbamate salt/amino compound) | Density (Kg/m$^3$) | Tensile strength (Kgf/cm$^2$) | Elongation (%) | Tear strength (Kgf/cm) |
| --- | --- | --- | --- | --- | --- | --- |
| 10 | CSBO (100) | CA-TETA (6.1/30.3) | 82 | 0.15 | 32.2 | 0.26 |
| 18 | CDCE (100) | CA-TETA (9.2/45.4) | 139 | 1.06 | 8.2 | Not measured |
| 19 | PE300C (100) | CA-TETA (10.1/49.6) | 142 | 0.88 | 15.1 | Not measured |
| 20 | RDCE (100) | CA-TETA (9.0/44.6) | 138 | 1.24 | 9.5 | Not measured |
| 21 | CSBO (100)/ CDCE (28.6) | CA-TETA (8.5/41.8) | 94 | 0.51 | 27.4 | 0.45 |
| 22 | CSBO (100)/ PE300C (36.1) | CA-TETA (8.4/41.7) | 93 | 0.28 | 35.9 | 0.26 |
| 23 | CSBO (100)/ RDCE (25.9) | CA-TETA (8.5/41.7) | 99 | 0.56 | 25.5 | 0.58 |

As known from Table 3, the foam material of the rigid compounds having cyclic carbonate groups (e.g. CDCD or RDCE) had a higher tensile strength, and their rigid properties were favorable for rigid foam.

Comparative Example 1

CSBO (100 parts by weight), TETA (30.4 parts by weight), filler 031DU40 (commercially available from AkzoNobel, 2.5% of the total weight of CSBO and TETA), and filler 920DU40 (commercially available from AkzoNobel, 2.5% of the total weight of CSBO and TETA) were stirred to mix well, and then put into an oven at 150° C. for 30 minutes to obtain a product. The product had a density of 572 Kg/m$^3$, a tensile strength of 0.77 Kgf/cm$^2$, an elongation of 28.9%, and a tear strength of 0.54 Kgf/cm. The product was obviously not foamed.

Comparative Example 2

CSBO (100 parts by weight), TETA (15.3 parts by weight), TMD (16.5 parts by weight), filler 031DU40 (commercially available from AkzoNobel, 2.5% of the total weight of CSBO, TETA, and TMD), and filler 920DU40 (commercially available from AkzoNobel, 2.5% of the total weight of CSBO, TETA, and TMD) were stirred to mix well, and then put into an oven at 150° C. for 30 minutes to obtain a product. The product had a density of 601 Kg/m$^3$, a tensile strength of 1.49 Kgf/cm$^2$, an elongation of 56.3%, and a tear strength of 0.75 Kgf/cm. The product was obviously not foamed.

TABLE 4

| | Compound having cyclic carbonate groups | Foaming agent (carbamate salt/amino compound) or amino compound | Density (Kg/m3) | Tensile strength (kgf/cm$^2$) | Elongation (%) | Tear strength (Kgf/cm) |
|---|---|---|---|---|---|---|
| Example 10 | CSBO (100) | CA-TETA (6.1/30.3) | 82 | 0.15 | 32.2 | 0.26 |
| Comparative Example 1 | CSBO (100) | TETA (30.4) | 572 | 0.77 | 28.9 | 0.54 |
| Comparative Example 2 | CSBO (100) | TETA (15.3)/ TMD (16.5) | 601 | 1.49 | 56.3 | 0.75 |

As shown in Table 4, the foam product with a low density could not be obtained without the carbamate salt.

Comparative Example 3

CSBO (100 parts by weight), CA-TETA (36.4 parts by weight), and filler 031DU40 (commercially available from AkzoNobel, 5% of the total weight of CSBO and CA-TETA) were stirred to mix well, and then put into an oven at 100° C. for 30 minutes to obtain a product. The product had a density of 860 Kg/m$^3$, which was obviously not foamed.

Comparative Example 4

CSBO (100 parts by weight), CA-TETA (36.4 parts by weight), and filler 031DU40 (commercially available from AkzoNobel, 5% of the total weight of CSBO and CA-TETA) were stirred to mix well, and then put into an oven at 170° C. for 30 minutes to obtain a product. The product had a density of 320 Kg/m$^3$. The bubbles in the product were broken. As known from Comparative Examples 3 and 4, the properties of the foam products would be deteriorated if the heating temperature of the foaming composition was too high or too low.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A foaming composition, comprising:
   100 parts by weight of a compound having cyclic carbonate groups; and
   a foaming agent,
   wherein the foaming agent includes:
   3 to 13 parts by weight of carbamate salt; and
   15 to 65 parts by weight of amino compound.

2. The foaming composition as claimed in claim 1, wherein the compound having cyclic carbonate groups has a chemical structure of:

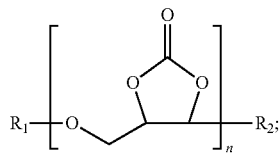

wherein n is an integer of 1 to 6,
   R$_1$ is aliphatic compound, alicyclic compound, aromatic compound, alkyl substituted aromatic compound, polyether oligomer, polyester oligomer, or a combination thereof; and
   R$_2$ is H, aliphatic compound, aliphatic compound containing cyclic carbonate groups, or a combination thereof.

3. The foaming composition as claimed in claim 1, wherein the carbamate salt has a chemical structure of:

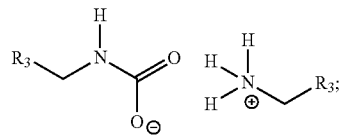

wherein R$_3$ is C$_{1-12}$ polyether amine, alkylamine, cyclic alkyl amine, aromatic amine, or a combination thereof.

4. The foaming composition as claimed in claim 1, wherein the amino compound comprises triethylenetetramine, trimethylhexamethylenediamine, polyethyleneimine, 1,3-bis(aminomethyl)cyclohexane, m-xylylenediamine, polyoxypropylenediamine, polyetheramine, ethylenediamine, or a combination thereof.

5. The foaming composition as claimed in claim 1, further comprising 0.1 to 10 parts by weight of epoxy compound having a chemical structure of:

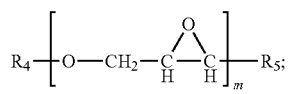

wherein m is an integer of 1 to 6;

$R_4$ is aliphatic compound, alicyclic compound, aromatic compound, alkyl substituted aromatic compound, polyether oligomer, polyester oligomer, or a combination thereof; and $R_5$ is H, aliphatic compound, aliphatic compound containing cyclic carbonate groups, or a combination thereof.

6. The foaming composition as claimed in claim 1, further comprising 2 to 10 parts by weight of filler, and the filler comprises hollow beads, vermiculite, or a combination thereof.

* * * * *